United States Patent [19]
Berning et al.

[11] Patent Number: 6,038,619
[45] Date of Patent: Mar. 14, 2000

[54] DISK DRIVE INITIATED DATA TRANSFERS RESPONSIVE TO SEQUENTIAL OR NEAR SEQUENTIAL READ OR WRITE REQUESTS

[75] Inventors: Lynn Charles Berning, Rochester, Minn.; Richard H. Mandel, III; Carlos H. Morales, both of San Jose, Calif.; Thanh Duc Nguyen, Morgan Hill, Calif.; Henry H. Tsou; Hung M. Vu, both of San Jose, Calif.

[73] Assignee: International Business Machines Corporation, Armonk, N.Y.

[21] Appl. No.: 08/865,338

[22] Filed: May 29, 1997

[51] Int. Cl.[7] .................................................. G06F 9/32

[52] U.S. Cl. .......................... 710/33; 710/31; 710/38; 711/112; 711/110; 712/245

[58] Field of Search ........................... 711/110, 111, 112, 711/204, 213; 710/24, 25, 27, 29, 30, 31, 32, 33, 34, 36, 38, 39, 52, 53, 58, 59; 712/245, 230

[56] References Cited

U.S. PATENT DOCUMENTS

| 4,207,609 | 6/1980 | Luiz et al. . |
| 4,916,605 | 4/1990 | Beardsley et al. . |
| 5,053,945 | 10/1991 | Whisler .................................... 707/200 |
| 5,745,793 | 4/1998 | Atsatt et al. .............................. 710/61 |
| 5,872,822 | 2/1999 | Bennett ................................. 375/372 |
| 5,878,280 | 3/1999 | Lucht ....................................... 710/52 |

*Primary Examiner*—B. James Peikari
*Attorney, Agent, or Firm*—R. Bruce Brodie; Esther E. Klein

[57] ABSTRACT

If consecutive read or write requests imposed on a DASD are of the same type and bear a defined sequential logical address relationship (pure sequential, near sequential), then a circular buffered data path using a pair of a synchronously managed read/write ports respectively coupling either a cyclic, concentric, multitracked storage medium or a cyclic, spiral-tracked storage medium and a device interface can continue data streaming unabated. Otherwise, the path would ordinarily have to be disabled and reconnected using a control microprocessor in respect of any random sequence of requests.

5 Claims, 2 Drawing Sheets

DISK DRIVE INITIATED DATA TRANSFERS RESPONSIVE TO SEQUENTIAL OR NEAR SEQUENTIAL READ OR WRITE REQUESTS

FIELD OF THE INVENTION

This invention relates to direct access storage devices (DASDs) having either cyclic, multitracked, or cyclic, spiral-tracked storage media utilizing a discrete, double, or circular-buffered data transfer path, and more particularly to methods and means for effectuating an increased data throughput in said transfer path.

DESCRIPTION OF RELATED ART

It is well appreciated in the prior art that physically a DASD comprises a spindled motor; at least one cyclic, multitracked disk coated with remanent magnetic material affixed to the spindle; a plurality of transducers for reading or recording data on selected ones of the tracks; a servo mechanism for radially positioning a honeycomb of arms tipped with counterpart transducers positionable over a selected one or more tracks; a buffered data path for transferring data between the transducers and a device interface; and several sequencers and/or microprocessor electrically coupling the interface, buffer, servo, and other means such as ECC. At least one disk surface has positioning signals recorded thereon for use by the servo as a location reference for positioning transducers over selected ones of the tracks.

Logically, a DASD comprises either a cyclic, multitracked, or spiral storage medium for data and means responsive to external read and write requests for establishing a buffered path to and copying data from at least one logical block address (LBA) location on the tracked medium identified by each read request and for establishing a buffered path to and for recording data located on at least one LBA on the tracked medium identified by each write request. The path is directionally responsive to the counterpart read or write request and includes a circular buffer.

Architecturally, DASDs operate either as a demand/responsive or a queued access storage subsystem externally attached to one or more sources of read and write requests. Parenthetically, the term "demand/response" connotes that a new request will not be accepted from a higher echelon until the last request is satisfied by a lower echelon and a positive indication is made by the lower to the higher echelon. The term "queued access" connotes a system interface such as the ANSI standard small computer system interface (SCSI) where several commands may be batched together and transferred to a subsystem or device at one time (or as one message), and the subsystem or device executes them asynchronously. This does avoid the overhead of a tag and response for each and every command or request. Also, DASDs can operate individually, clustered, or orchestrated as in various forms of RAID arrays. Where they are clustered as part of a larger subsystem, then storage management control and functionality can be enriched. This usually requires a cluster or array control unit or the like. Such higher levels of storage subsystem integration are exemplified by the IBM 3990/3390 DASD and are described in Luiz et al., U.S. Pat. No. 4,207,609, "Method and Means for Path Independent Device Reservation and Reconnection in a Multi-CPU and Shared Device Access System", issued Jun. 10, 1980; and more recently in Beardsley et al., U.S. Pat. No. 4,916,605, "Fast Write Operations", issued Apr. 10, 1990.

Over the years, storage functions have migrated to/from CPU operating systems to attached subsystems or devices. This process has been accelerated because of availability of inexpensive microprocessors and their simplified cousins called "sequencers". Thus, contemporary disk drives will include an interrupt-driven, task-switched microprocessor and satellite processors or sequencers. The microprocessor conducts overall device management including error detection and data recovery, while the sequencers handle specialized functions such as device interface attachment, disk reading and writing, and buffer management.

Historically, buffers were expensive and were sparingly used at any level in a storage subsystem. However, the high availability of inexpensive random access memory (RAM) permits use of double or circular buffering in the movement or staging of data between the device interface and the disk storage medium. Additionally, such RAM can also be implemented as a writable control store (WCS) for sequencers and as a local memory for the microprocessor.

The availability of processing and local memory within the disk storage device permits the device to work smarter and harder. Thus, a control program executing on a processor or sequencer within the DASD can implement operating system features. These features include monitor and interrupt-driven, task-switching and managing subordinate asynchronous functions as resource managers or objects. Typically, a DASD will include an interface manager having code resident in a WCS local to a dedicated sequencer and the same for a disk manager. The interface manager will interpret external read or write requests and invoke the control processor via an interrupt. The latter will perform address translation from the logical address specified in the request and cause the servo to position the DASD transducer over the translated track address. Each read request will cause the disk manager to stage the data on a track to the buffer, and the interface manager will move data from the buffer to the device interface. Likewise, each write request will cause the interface manager to move externally-supplied data into the buffer, while the disk manager will cause data from the buffer to be written on the referenced track.

The elapsed time between presentation of a read or write request to a storage device and the responsive staging up or destaging of data is a significant performance measure. It is evident that such time will vary due to the latency, patterns of referencing (read or write and random or sequential), locality of the data, track switching, error susceptibility and data recovery procedures, and path enablement and disablement. Significant attention has been paid to improving DASD performance. This includes enhancing the ability to detect and correct errors on the fly as to where data is staged responsive to read requests, and byte and/or burst correction can be made to digital data whether caused by noise, thermal asperity, track misregistration, or the like. However, one aspect needing improvement is that of data rate under various patterns of referencing.

In this specification, the storage model, as viewed from an application executing on a host CPU, comprises at least one disk storage device having a bounded number of consecutively numbered logical block addresses (LBAs) for storing data. Any mapping or address translation between an LBA and the real DASD location (cylinder, track, and head) is performed within the device.

SUMMARY OF THE INVENTION

It is accordingly an object of this invention to devise a method and means for increasing the data throughput in the buffered transfer path of a DASD under read or write referencing.

It is a related object that said method and means pertinently apply to DASDs having a demand/response or SCSI-type interface to an attaching host CPU, bus, or storage control unit.

It is yet another related object that said method and means be operative under conditions of track switching, and buffer overflow and underflow.

The invention is predicated on the observation that if consecutive read or write requests imposed on a DASD are of the same type and bear a defined sequential logical address relationship (pure sequential, near sequential), then a circular buffered data path between the cyclic-tracked medium and the device interface can continue data streaming unabated. Otherwise, the path would ordinarily have to be disabled and reconnected in respect of any random sequence of consecutive requests. Advantageously, the data streaming between the disk medium and interface responsive to the sequential requests can include a pause and resume of the buffer fill or disk operations where buffer overrun, underflow, track switching, or the like may occur. This devolves from the fact that a pair of asynchronous interface and disk managers are used to control the connectability of the data buffer path during this interval.

The above objects are believed satisfied by a method and means in which the throughput processing of a circularly-buffered data path remains connected between either a cyclic, concentric, multitracked disk or a cyclic, spiral-tracked disk and a storage device interface as a function of the current read or write request being of the same type as the immediate predecessor request, and the starting logical block address of the current request lies within the range LBA+1 to LBA+K. In this regard, LBA is the last logical block address of data satisfying the predecessor request, LBA+1 is the next consecutive logical block address on the disk, and LBA+K is a predetermined block address K consecutive blocks removed from LBA. Otherwise, the throughput is interrupted by the path being disabled and then being enabled by control program means responsive to each successive read or write command.

DESCRIPTION OF THE PREFERRED EMBODIMENT

Figure 1:
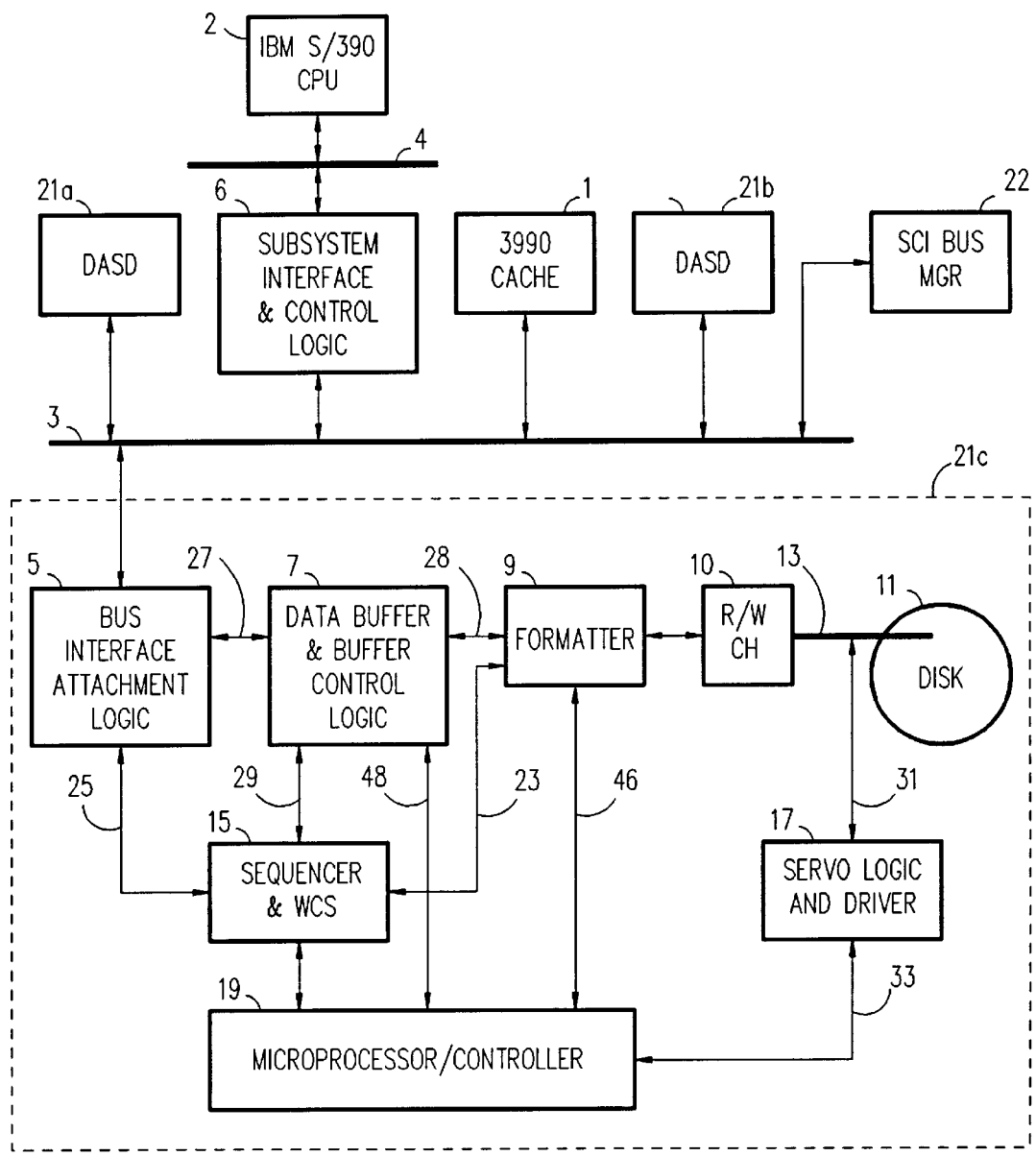
FIG. 1 shows a block diagram of a storage subsystem externally attaching a host CPU and an exploded partial logical view of a direct access storage device (DASD).

Referring now to FIG. 1, there is shown a block diagram of a storage subsystem externally attaching a host CPU 2 and an exploded partial logical view of a direct access storage device (DASD). In such an arrangement, applications executing on a host CPU 2 invoke the resident operating system to execute read or write requests for data not present in the CPU main memory, but hopefully resident in attached external storage. Such requests would be accessed over a CPU bus 4 via a path including subsystem interface and subsystem control logic 6.

Hosts and DASD Storage Subsystems Environments

DASD storage subsystems attached to large MVS multiprogramming, multitasking CPUs are of the hierarchical demand/response type. These are exemplified by the IBM 3990/3390 Model 6 and the EMC Symmetrix 5500.

Such subsystems are organized around a large cache 1 with a DASD-based backing store. This means that read requests are satisfied from the subsystem cache 1 over a subsystem bus 3 through interface 6 to the CPU 2. Otherwise, the data satisfying those requests are staged up from the DASDs 21a, 21b, or 21c to the cache 1 and from the cache 1 to the CPU 2. In contrast, write updates result in data being sent from the CPU to the cache 1 or to a separate nonvolatile store (NVS), or both. This is the case with the IBM 3990 Model 6. The NVS stored data is then destaged or 15 written out to the DASDs on a batched basis asynchronous to processing the write requests. The term "demand/response" connotes that a new request will not be accepted from a higher echelon until the last request is satisfied by a lower echelon and a positive indication is made by the lower to the higher echelon. However, bus 3 may also implement an ANSI-defamed SCSI standard under a bus manager 22.

The DASDs 21a, 21b, and 21c are shown bus coupled over a time division multiplexed bus 3 to the subsystem control logic 6. As mentioned, SCSI attachment is attractive where the attached devices can be loosely coupled and where groups of commands can be sent to them for execution. Alternatively, the coupling of the DASDs could be also by way of a multidrop path with parallel control and data lines. DASD 21c is shown in a partially exploded logical view and the organization would be identical for DASDs 21a and 21b.

In MVS-compatible systems, data is staged to and from each of the disk devices 21a–21c one track at a time. This avoids complexity of track switching at other than complete track revolutions. For instance, if a read request spans two and one-half tracks, it is less complex to stage three tracks than stage two and three-quarter tracks. Now, brief mention of the general attributes of the data path should be made.

DASD Logical Organization

Taking DASD 21c as illustrative, it is attached to the storage subsystem by way of a bus interface attachment logic 5. Logic 5 provides a standardized SCSI-type "message" interface for both read and write requests and write data in the destage direction, and status and data reporting in the staging direction.

There exist two information pathways in each device 21. One pathway is dedicated to processing data requests and reporting completion status to the subsystem controller or the CPU. The other pathway moves any requested data. All requests (also termed SCSI commands or the like) are sent by the interface logic 5 to a sequencer and writable control store (sequencer assembly) 15. The sequencer assembly evaluates the function and initiates the electromechanical accessing of the desired disk track location. That is, the sequencer assembly causes a microprocessor 19 to dispatch a head and arm assembly 13 to move over one of a plurality of tracks located on a cyclic recording medium 11. More particularly, the microprocessor 19 interprets or translates an address included in a current read or write request from the sequencer assembly 15 over path 35 and provides signal positioning information to a servo logic and driver 17. The servo driver positions head and arm assembly 13 either radially inward or outward so as to minimize the difference between the starting track address in the request and the track address indicia sensed from the disk medium 11.

Referring again to FIG. 1, microprocessor 19 is shown with a control path 48 to data buffer and control logic 7 and another path 46 to the formatter. Clearly, the microprocessor must manage all elements, especially the interface manager including the sequencer 15 and the disk manager including the formatter 9, in establishing a path between the disk 11 and interface logic 5 for each random read or write request. Data read by head arm assembly 13 is detected and shaped in read/write channel 10. It is then further converted by the formatter 9 into a stream of 1's and 0's and applied to buffer 7. Writing is the inverse of the read operation. Formatter 9 includes a programmable device (not shown) permitting it to execute any number of conditional functions. As is the case with sequencers, the microcode required for the formatter to execute the functions so described are believed well within the capability of the skilled artisan and are not further elaborated in this specification. However, since this invention recognized that once established the path need not be taken down and reconnected for sequential and near sequential series of read or write requests, then the description of the preferred embodiment is on the interface manager through the sequencer and the disk manager through the formatter that principally regulate the data throughput under varying requests and buffer loading.

Circular Buffers and Their Attributes

The term circular-managed buffer means that the buffer is logically partitioned into N equal-sized segments, preferably counterpart to either a standard unit of track measure such as a sector or a standard unit of logical address measure such as that of a logical block or LBA. Logical or physical counters are used as pointers to the current buffer address being filled and the current buffer address being read. Such buffers are also "double buffers" in that writing into some portion of the buffer can occur asynchronous to the transferring out of data from some other portion of the buffer and at different rates.

A circular buffer can be implemented preferably by some form of random access memory whose addressing is managed in a sequential and reentrant manner.

That is, the memory addressing is managed such that writing into the buffer or transferring data from the buffer is respectively sequentially addressed from 0 to N−1 modulo N. This means that the next address after N is 0, etc. In the embodiment of this invention, for an assumed direction of data movement, the interface manager might be writing a unit of data into the circular buffer at address j and incrementing an associated pointer such that the next address occurs at (j+1) modulo N, while the disk manager transfers a unit of data from another register address k and increments a pointer so that its next address is (k+1) modulo N.

In order to know where the pointers are in relation to each other, a simple arrangement can be formed from a pair of address/counters modulo N, a subtraction circuit, and decision logic. The subtraction circuit would provide a pair of relative magnitude differences between the pointer positions as they increment in the same direction around the circular buffer addresses. With the exception of the case where the pointers are on exact opposite sides of the buffer, there is a "short distance" and a "long distance".

Circular Buffer Overflow and Underflow

Among the concerns in the management of a circular buffer is that of overflow and underflow. Overflow is the writing over of data in the buffer prior to its being read out. Overflow can be managed by inhibiting writing into the buffer once a predetermined distance between the pointers is reached. That is, inhibiting or pausing the filling of the buffer should be done when the writing pointer is about to overtake the reading pointer. Typically, the counters are incremented concurrent with the counterpart buffer read or write action. The subtraction circuit and decision logic can inhibit filling the buffer if the logic takes into account the rate and direction of closure between the pointers.

In contrast, underflow is the reading of data from the buffer from previously read but as yet unfilled positions. Clearly, this means that the reading pointer is overtaking the writing pointer. Underflow is also managed by inhibiting reading from the buffer once a predetermined distance between the pointers is reached. Here, too, the counters, the subtraction circuit, and the decision logic can inhibit transferring data from the buffer where the logic takes into account the rate and direction of closure between the pointers.

One consequence of buffering is to largely time decouple the buffer fill and read operations except for overflow and underflow. This, in turn, permits the operations of the interface manager, including the sequencer assembly 15, and the disk manager, including the formatter 9, to be performed asynchronously. This has immediate practical significance in the pause and resume operation.

The Interface and Disk Manager Constructs

The term "manager" as used in this specification science denotes a cluster of hardware and executable software for regulating an activity or collection of related functions. In the embodiment of this invention, "interface manager" and "disk manager" are constructs denoting distributed function. In this regard, the interface manager is largely resident in the sequencer assembly 15, while the disk manager is largely resident in formatter 9.

Figure 2:
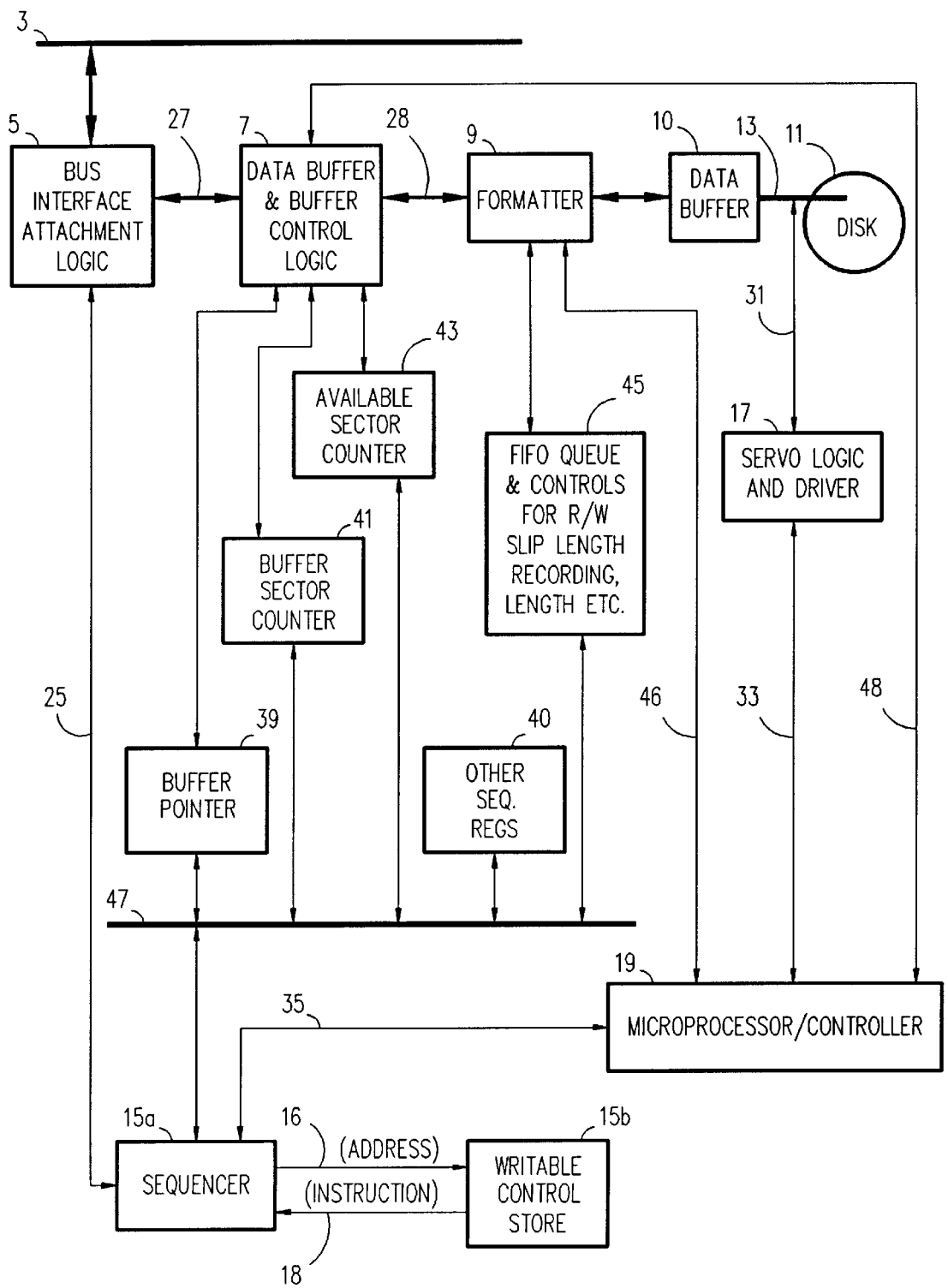
FIG. 2 depicts a block diagram of the circular buffered data path and the relations among the interface manager, disk managers, and the device microprocessor according to the invention.

As mentioned, the manager construct comprises distributed function. Illustratively, the disk manager normally reads and writes data to and from disk 11 and the buffer 7. However, the disk manager must invoke pause and resume when the buffer 7 might be overrun, or when an end-of-track condition on disk 11 is sensed prior to completion of the request. In the first case, the disk manager pauses and samples the various counters until sufficient buffer space is available; then it resumes its fill operation (disk latency is assumed). In the second case, sequencer assembly 15 must be invoked in order to cause the microprocessor 19 and servo driver 17 to radially change the position of head and arm assembly 13. The pause and resume control flow may be expressed paradigmatically as:

Disk Manager
  Read Operation from the Disk
    Pause: data buffer full, or end of track—the latter requiring servo operation
    Resume: buffer available and head position on the target track
  Write Operation Onto the Disk
    Pause: no data available, or end of track—the latter requiring servo operation
    Resume: data available and head position on the target track Referring now to FIG. 2, a block diagram is shown of the circular buffered data path and the relations among the interface manager, disk managers, and the device microprocessor according to the invention. In this regard, FIG. 2 shows significantly greater logical detail of the major device elements discussed with respect to FIG. 1. First, sequencer assembly 15 comprises a writable control store (WCS) 15b driving sequencer 15a as a special purpose controller, a bus 47 operative as a regulatory communications path between the sequencer, and a plurality of counters 39, 41, and 43. The sequencer bus 47 is used as the pathway exchanging the space fill and empty condition of buffer 7 and formatter 9 through FIFO controller 45. Second, a WCS contains microcode program sequences through which commands or requests incident to the sequencer 15a can be interpreted and compared, as well as other activities.

Sequential and Near Sequential Read or Write Requests

As previously mentioned, the invention is predicated on the observation that if consecutive read or write requests imposed on a DASD are of the same type and bear a defamed sequential logical address relationship (pure sequential, near sequential), then a circular buffered data path between a cyclic tracked medium and a device interface can continue data streaming unabated. Otherwise, the path would ordinarily be disabled and reconnected in respect of any random sequence of consecutive requests.

In this specification, a "request" or "command" is information used by a processor for performing an indicated action. Syntactically, it comprises an operation code or portion, modifiers, and an address. For purposes of a storage subsystem, the commands or requests are either "read" or "write". In this invention, the logical storage model of each DASD assumes a linear contiguous address field of equal length fixed blocks of data storage up to some upper bound for the device. These are denominated as logical block addresses or LBAs.

A "sequential read request" is a read request identical to an immediately preceding read request except for its address (LBA) field. The LBA corresponds to the previous command's last LBA+1. In other words, the new read request continues where the previous one had stopped. The current request must originate from the same source as the predecessor. A "near sequential read request" is a read request identical to an immediately preceding read request except that the address of the current request lies in the range LBA+1 to LBA+K, where K is a predetermined number of LBAs after the last LBA transferred with the prior request.

A "sequential write request" is a write request identical to an immediately preceding write request except for its address (LBA) field. The LBA corresponds to the previous command's last LBA+1. Also, the current request must originate from the same source as the predecessor. A "near sequential write request" is a write request identical to an immediately preceding write request except that the address of the current request lies in the range LBA+1 to LBA+K, where K is a predetermined number of LBAs after the last LBA transferred with the prior request. The value used for K is influenced by empirical factors such as latency time in accessing LBA+K from LBA+1. If the latency time is significant, then this fast path may not be beneficial.

Processing Sequential and Near Sequential Read Requests Between a Device Interface and a Cyclic Tracked Disk Referring now to FIG. 2, a random first read request is received by attachment logic 5 and applied to sequencer 15a over the coupling path 25 and executed. This involves causing the controller 19 and the servo logic and driver 17 to position the head and arm assembly 13 over an appropriate track on the disk 11 and then the disk manager to move data into buffer 7 through the formatter 9. Next, the interface manager through the sequencer completes the transfer from the buffer to the requesting source through attachment logic 25 and to bus 3. The sequencer then sends status to the requester. Concurrently, the disk manager will stage more data from disk 11 into buffer 7.

After the status is sent, sequencer 15 monitors data transferred into the buffer 7 from disk 11. Once enough disk track sectors have been read to satisfy a count equal to that of the previous request, the sequencer enters what might be termed a primed state. That is, the sequencer is conditioned that in the event the next request can be deemed sequential, then an appropriate counter or register will also be primed to point to the next data. When a new command is received, sequencer 15 compares the new one with its predecessor. If it is sequential, data transfer is started immediately. If it is required to adjust the transfer length, the adjustment to the lengths via FIFO controls 45 is made and passed to the disk manager represented in the formatter 9. Then the data transfer will be immediately executed.

If the current request is deemed a near sequential read, then sequencer 15 updates the buffer pointer 39. This pointer identifies the location of the data that corresponds to the starting LBA of the current request. The sequencer next sets the value in an available sector counter 43 by an amount equal to the starting LBA of the current request minus the last LBA of the previous request minus one. At this point, the sequencer 15 starts the data transfer.

The available sector counter (ASC) 43 is a counter used to ascertain how many sectors are present in the buffer 7. Thus, ASC is increased by one each time a new sector of data has been transferred from disk 11 to buffer 7. Likewise, it is diminished by one when a sector of data has been moved from the buffer 7 to the interface 5. If the count in the ASC equals the count in a buffer sector counter (BSC) 41, then data streaming is suspended (pause invoked). Once the content of the ASC 43 is less than the content of the BSC, then data streaming resumes automatically. This occurs either by the ASC being decremented by the sequencer 15 or by a data transfer from buffer 7 to interface 5. Once the data transfer has been successfully completed, status is sent.

After the disk manager finishes transferring the requested data, the disk manager reads more data into buffer 7 from disk 11 until the buffer 7 is filled up or that another request has been applied to the device 21c. This requires that the read ahead operation halt. If the request is not a sequential or near sequential read, then the path must be reestablished.

Processing Sequential and Near Sequential Write Requests Between a Device Interface and Cyclic Tracked Disk A random write request command is received and assessed by the sequencer 15 and executed through a normal path in which data is transferred from the interface logic 5 into the buffer 7. Concurrently, the disk manager engages the servo driver 17 via the sequencer and controller 19 to position the head arm assembly 13 and data recorded on one or more selected tracks of the disk 11. After the requested data has finished transferring in to the buffer, the status is sent from sequencer 15 through the interface 5.

When a new request is received, sequencer 15 compares the new one with its predecessor. If it is a sequential write, data transfer is started immediately. If it is required to adjust the transfer length, the adjustment to the lengths via FIFO controls 45 is made and passed to the disk manager represented in the formatter 9. Then the data transfer will be immediately executed.

If the new request qualifies as a near sequential, the sequencer 15 does NOT modify the contents of either the buffer pointer 39 or the ASC 43. Rather, the sequencer informs the formatter 9 of the number of recordable sectors on the disk that should be skipped and the number of sectors to be written after the skip operation. That is, the sequencer 15a sends indicia of skip length and recording length into a first-in/first-out (FIFO) stack or queue device 45 coupling formatter 9. In turn, formatter 9 pops the indicia from stack device 45 and performs the indicated recording operation. The FIFO depth determines how many recording operations can be stacked. It should be recalled that the sequencer then starts the data transfer. The ASC 43 indicates buffer space availability in terms of the number of sectors. The BSC 41 tracks buffer space availability for receiving data from the interface. In this regard, the ASC is decremented by one each time data is moved from the buffer 7 and recorded on disk 11. Also, the ASC is incremented by one each time a sector of data is moved from the interface 5 into the buffer 7. When the contents of the ASC equal that of the BSC, data streaming is suspended. Once the contents of the ASC are less than the BSC, data streaming resumes automatically. This condition pertains either by the sequencer decrementing the ASC or by the disk manager writing out a sector onto disk 11.

While the invention has been described with respect to an illustrative embodiment thereof, it will be understood that various changes may be made in the method and means herein described without departing from the scope and teaching of the invention. Accordingly, the described embodiment is to be considered merely exemplary, and the invention is not to be limited except as specified in the attached claims.

What is claimed is:

1. A method for managing the movement of data responsive to external read or write requests between an interface and a storage device, the device having either a cyclic, concentric, multitracked storage disk medium or a cyclic, spiral-tracked storage disk medium and means for establishing a path to and copying data from at least one logical block address (LBA) on a counterpart track of said disk responsive to each read request, and for establishing a path to and recording data located on at least one LBA on a counterpart track of the disk responsive to each write request, said path including a circular buffer coupling a disk manager means to an interface manager means, comprising the steps of:

(a) establishing a data transfer path including the device interface, the circular buffer, and the disk responsive to a random read or write request and effectuating a datastreaming in a direction consonant with the request;

(b) ascertaining whether an immediate successor read or write request is of the same type (read or write) and expresses a sequential or near sequential logical address relationship with its immediate predecessor request wherein
   (i) a sequential address relationship exists where the starting LBA of an immediate successor request is the next consecutive LBA to the last LBA included in the immediate predecessor request; and
   (ii) a near sequential address relationship exists where the starting LBA of the immediate successor request lies within a range between the next consecutive LBA to the last LBA included in the immediate predecessor request and a predetermined maximum number K consecutive LBAs; and (c) continuing said datastreaming unabated in a path through and including the circular buffer between the disk and the device interface if the requests match as to type and sequential address relationship, otherwise disabling the path and repeating step (a).

2. The method according to claim 1, wherein step (c) further includes the substeps of:

monitoring the space available in the buffer by way of an incrementable/decrementable counter, and where the immediate successor request is of a read sequential type;

incrementing the counter by one for each unit of data such as a sector transferred from the disk to the buffer, and decrementing the counter by one for each unit of data transferred from the buffer to the interface;

suspending datastreaming upon the counter value reaching a predetermined value; and resuming datastreaming upon the counter value being decremented to less than the predetermined value.

3. The method according to claim 2, wherein the step of resuming datastreaming after said streaming having been suspended includes the substeps of:

transferring units of data from the buffer to the interface and decrementing the counter; and repeating the transferring and decrementing steps until the counter value is less than the predetermined value.

4. The method according to claim 1, wherein step (c) further includes the substeps of:

monitoring the space available in the buffer by way of an incrementable/decrementable counter, and where the immediate successor request is of a write sequential type;

incrementing the counter by one for each unit of data such as a sector transferred from the interface to the buffer, and decrementing the counter by one for each unit of data transferred from the buffer to the disk;

suspending datastreaming upon the counter value reaching a predetermined value; and resuming datastreaming upon the counter value being decremented to less than the predetermined value.

5. The method according to claim 4, wherein the step of resuming datastreaming after said streaming having been suspended includes the substeps of:

transferring units of data from the buffer to the disk and decrementing the counter; and repeating the transferring and decrementing steps until the counter value is less than the predetermined value.

* * * * *